United States Patent
Brequigny et al.

(10) Patent No.: US 9,596,625 B2
(45) Date of Patent: Mar. 14, 2017

(54) TECHNIQUE FOR COMMUNICATION BETWEEN USER EQUIPMENT AND A DATA NETWORK IN A COMMUNICATION NETWORK

(75) Inventors: Guillaume Brequigny, Vernon (FR); Delphin Barankanira, Antony (FR)

(73) Assignee: ORANGE, Paris (FR)

( * ) Notice: Subject to any disclaimer, the term of this patent is extended or adjusted under 35 U.S.C. 154(b) by 283 days.

(21) Appl. No.: 13/990,686

(22) PCT Filed: Nov. 28, 2011

(86) PCT No.: PCT/FR2011/052784
§ 371 (c)(1),
(2), (4) Date: Jan. 20, 2014

(87) PCT Pub. No.: WO2012/072928
PCT Pub. Date: Jun. 7, 2012

(65) Prior Publication Data
US 2014/0140322 A1    May 22, 2014

(30) Foreign Application Priority Data

Nov. 30, 2010  (FR) ...................................... 10 59933

(51) Int. Cl.
*H04W 36/34*  (2009.01)
*H04W 76/02*  (2009.01)
(Continued)

(52) U.S. Cl.
CPC ....... *H04W 36/0011* (2013.01); *H04L 67/141* (2013.01); *H04W 48/14* (2013.01);
(Continued)

(58) Field of Classification Search
None
See application file for complete search history.

(56) References Cited

U.S. PATENT DOCUMENTS

| 2007/0253359 | A1 | 11/2007 | Hall et al. |
| 2007/0281699 | A1 | 12/2007 | Rasanen |
| 2008/0320149 | A1 | 12/2008 | Faccin |
| 2009/0129342 | A1* | 5/2009 | Hwang et al. ................ 370/331 |
| 2009/0196231 | A1 | 8/2009 | Giaretta et al. |
| 2009/0252132 | A1 | 10/2009 | Song et al. |

(Continued)

OTHER PUBLICATIONS

International Search Report and Written Opinion dated Feb. 14, 2012 for corresponding International Application No. PCT/FR2011/052784, filed Nov. 28, 2011.
(Continued)

*Primary Examiner* — Hassan Phillips
*Assistant Examiner* — Duc Duong
(74) *Attorney, Agent, or Firm* — David D. Brush; Westman, Champlin & Koehler, P.A.

(57) ABSTRACT

A method and apparatus are provided for communication, within a packet-mode communication network, between user equipment and a data network. A session is established between the user equipment and a data-network access gateway via an access network. The method includes: a step of detecting a request for access to a service on the basis of at least one packet transmitted by the user device via the established session; a first step of determining, on the basis of at least one criterion, that a new session is to be established; a second step of determining another access gateway, the other gateway being suitable for the service required by the user equipment; and a step of triggering the establishment of the new session between the user equipment and the other access gateway, the establishment being initiated by equipment of the packet-mode communication network.

9 Claims, 4 Drawing Sheets

(51) Int. Cl.
  *H04W 36/00* (2009.01)
  *H04W 48/00* (2009.01)
  *H04W 88/16* (2009.01)
  *H04L 29/08* (2006.01)
  *H04W 48/14* (2009.01)

(52) U.S. Cl.
  CPC ......... *H04W 48/17* (2013.01); *H04W 76/027* (2013.01); *H04W 88/16* (2013.01)

(56) References Cited

U.S. PATENT DOCUMENTS

| | | | |
|---|---|---|---|
| 2009/0262707 A1* | 10/2009 | Wu et al. | 370/332 |
| 2010/0027448 A1 | 2/2010 | Puthiyandyil et al. | |
| 2010/0080172 A1 | 4/2010 | Jin et al. | |
| 2010/0124198 A1 | 5/2010 | Wong | |
| 2010/0246533 A1* | 9/2010 | Lundin et al. | 370/332 |
| 2010/0281151 A1* | 11/2010 | Ramankutty | G06F 15/173 709/223 |
| 2011/0113278 A1* | 5/2011 | Yin | H04L 12/24 714/4.1 |
| 2011/0131338 A1* | 6/2011 | Hu | 709/229 |
| 2011/0202485 A1 | 8/2011 | Cutler et al. | |
| 2012/0082161 A1* | 4/2012 | Leung et al. | 370/392 |
| 2012/0250616 A1 | 10/2012 | Hu et al. | |
| 2012/0282924 A1 | 11/2012 | Tagg et al. | |
| 2012/0314632 A1* | 12/2012 | Martinez De La Cruz et al. | 370/310 |
| 2013/0064086 A1* | 3/2013 | Hall et al. | 370/231 |
| 2013/0142042 A1* | 6/2013 | Garcia Martin et al. | 370/230 |
| 2013/0208661 A1* | 8/2013 | Nylander et al. | 370/328 |

OTHER PUBLICATIONS

"3rd Generation Partnership Project: Technical Specification Group Services and System Aspects; Multi Access PDN Connectivity and IP Flow Mobility (Release 9)" 3GPP Standard; 3GPP TR 23.861, 3rd Generation Partnership Project (3GPP), Mobile Competence Centre; 650, Route Des Lucioles; F-06921 Sophia-Antipolis Cedex; France, No. V1.3.0, Feb. 10, 2010 (2010-0-10), pp. 1-49, XP050401889, Annex B.

"3rd Generation Partnership Project: Technical Specification Group Services and System Aspects; IP Flow Mobility and Seamless Wireless Local Area Network (WLAN) Offload; Stage 2 (Release 10)", 3GPP Standard; 3GPP TS 23.261, rd Generation Partnership Project (3GPP), Mobile Competence Centre; 650, Route Des Lucioles; F-06921 Sophia-Antipolis Cedex; France, No. V10.1.0. Sep. 29, 2010 (Sep. 29, 2010), pp. 1-22, XP050442325, section 5.

"3rd Generation Partnership Project: Technical Specification Group Services and System Aspects; Local IP Access and Selected IP Traffic Offload (Release 10)" 3GPP Standard; 3GPP 23.829, 3rd Generation Partnership Project (#GPP), Mobile Competence Centre; 650, Route Des Lucioles; F-06921 Sophia-Antipolis Cedex; France, No. V1.3.0, Sep. 22, 2010 (Sep. 22, 2010), pp. 1-44, XP050442123, sections 5.5 et 5.6.

International Preliminary Report on Patentability and English translation of the Written Opinion dated Jun. 4, 2013 for corresponding International Application No. PCT/FR2011/052784, filed Nov. 28, 2011.

International Search Report and Written Opinion dated Feb. 10, 2012 for corresponding International Application No. PCT/FR2011/052787, filed Nov. 28, 2011.

International Preliminary Report on Patentability and English translation of the Written Opinion dated Jun. 4, 2013 for corresponding International Application No. PCT/FR2011/052787, filed Nov. 28, 2011.

Office Action dated Jun. 7, 2016 from the USPTO for U.S. Appl. No. 13/990,694, filed Jan. 21, 2014.

Office Action dated Sep. 11, 2015 from the USPTO for U.S. Appl. No. 13/990,694, filed Jan. 21, 2014.

Office Action dated Dec. 13, 2016 from the USPTO for U.S. Appl. No. 13/990,694, filed Jan. 21, 2014.

* cited by examiner

TECHNIQUE FOR COMMUNICATION BETWEEN USER EQUIPMENT AND A DATA NETWORK IN A COMMUNICATION NETWORK

CROSS-REFERENCE TO RELATED APPLICATIONS

This application is a Section 371 National Stage Application of International Application No. PCT/FR2011/052784, filed Nov. 28, 2011, which is incorporated by reference in its entirety and published as WO 2012/072928 on Jun. 7, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention lies in the field of communication networks in which access is performed in packet mode.

BACKGROUND OF THE DISCLOSURE

Evolutions of the UMTS ("Universal Mobile Terrestrial System") mobile communication network standardized by the 3GPP organization are under discussion. These evolutions constitute the basis of a future fourth generation and are also called LTE ("Long Term Evolution"). They envisage in particular an evolution of the core network EPC ("Evolved Packet Core") in which the exchanges are performed solely in packet mode. During its attachment to the mobile network, the user equipment UE establishes a session with a packet data network and obtains an address in this network. Thus, the user equipment possesses permanent connectivity as long as it is attached to the mobile network. The user equipment UE is identified by an IPv4 address and/or by an IPv6 prefix. The packet data network is for its part identified by an identifier of the data network APN ("Access Point Name"). This session is also called "PDN connection", PDN for "Packet Data Network". Such a session comprises at least one medium, called "bearer", by default and can comprise one or more dedicated media.

This session is established between the user equipment UE and the data network by way of an access gateway P-GW. This access gateway P-GW is the facility of the mobile communication network in charge of the interface with the packet data network. A gateway P-GW can thus make it possible to access services offered on the Internet communication network or else services offered by an operator.

An operator of the communication network may desire to have a certain flexibility in the choice of the access gateway as a function of a service requested by the user equipment. It is not possible in the current version of the standards to modify the access gateway P-GW, which has made it possible to establish a session.

SUMMARY

According to a first aspect, the subject of the invention is a method of communication in a packet mode communication network between a user equipment and a data network, a session having been established between said user equipment and a gateway for access to the data network by way of an access network, said method comprising:
  a step of detecting a request for access to a service on the basis of at least one packet transmitted by the user equipment by means of the established session;
  a first step of determining as a function of at least one criterion that a new session has to be established;
  a second step of determining another access gateway, said other gateway being suitable for the service requested by the user equipment;
  a step of triggering establishment of said new session between the user equipment and said other access gateway, said establishment being initiated by an entity of the packet mode communication network.

The communication network is for example of the EPC type, for "Evolved Packet Core", and comprises in particular the evolutions envisaged for the core network within the framework of the LTE evolutions.

The data network can be the Internet public communication network or else any other external data network, such as an Intranet network, or a network of an operator.

Access of the user equipment to the communication network can be performed by way of various types of access networks. The access network can be radio or wire-based. The radio access network can comply with the second and third generation versions and also with the long-term evolutions of the third generation (LTE) that are defined by the 3GPP organization. The access network can also be a non-3GPP radio access network, such as WIFI®, WiMAX, etc. access. The access network can further be an ADSL ("Asymmetric Digital Subscriber Line") access network.

The communication method thus makes it possible to establish a new session on the initiative of the network. The new gateway for access to a data network in packet mode has been chosen by one of the entities of the network so as to be suitable for the provision of a requested service. It is thus possible to specialize the access gateways P-GW as a function of particular services. The communication method makes it possible furthermore to distribute the establishment of sessions relating to a service between a plurality of access gateways.

It is also possible to establish the new session toward a gateway P-GW implementing certain particular functions, such as charging, filtering, control of service policies. The communication method thus makes it possible to implement quality of service policies differentiated as a function of a charging level.

It is stressed here that the evolutions at the core network level within the framework of the LTE discussions do not envisage the possibility of initiating a session from an entity of the communication network. Indeed, in such a network, the user entities possess permanent connectivity with the network. Thus, it is envisaged solely that the session establishment be on the initiative of the user equipment.

It is also stressed that the communication method is compatible with the procedures such as defined within the framework of the evolutions at the core network level within the framework of the LTE discussions and require only limited modifications.

Operation at the user equipment level is also simplified since in one embodiment, the user equipment need ascertain only a single APN data network identifier. In this case, the network can, for its part, manage different data network identifiers and select a particular identifier as a function of criteria inherent thereto.

The detection of the request for access to a service on the basis of at least one packet can be performed directly on the basis of the packet, or else indirectly by notification of an entity of the network having received the packet.

According to a particular characteristic of the communication method, the criterion belongs to the group comprising an identifier of the service, and an identifier of an application.

According to yet another particular characteristic, the detection step is implemented by inspection of a packet stream associated with said session.

This inspection of the packets can be performed at various OSI levels. It can involve SPI inspection ("Shallow Packet Inspection") at OSI levels 3 or 4. It can also involve thorough inspection of the stream of data packets at OSI levels 7 and above or "Deep Packet Inspection".

According to another particular characteristic of the communication method, the other gateway is also determined as a function of at least one item relating to the user equipment.

This item belongs to the group comprising an item relating to a location, an item relating to subscription data, or a type of user equipment.

Thus, it also makes it possible to choose a gateway P-GW, whose location in the communication network is determined as a function of the location of the user equipment, in order to optimize the routing of the streams of data packets, for example for a television service.

The user's subscription data make it possible to obtain a subscribed quality of service policy. The taking into account of this item thus makes it possible to choose a suitable access gateway as a function of the subscribed quality of service. Given that it is possible to establish the new session to an access gateway P-GW implementing certain particular functions, such as charging, filtering, control of service policies, the implementation of quality of service policies differentiated as a function of subscription data, and consequently of a charging level, is thus more easily implemented.

The type of user equipment makes it possible to select an access gateway as a function for example of the generation of the terminal (2G, 3G, LTE), of the generation of the SIM card inserted into the terminal, etc.

According to another particular characteristic, one of the two access gateways transmits a request regarding establishment of a new session to a mobility management entity.

This message is for example a "PDN Connectivity Request" message used on an interface between two entities of the network. It allows the mobility management entity to trigger the establishment of the new session. In one embodiment, the mobility management entity implements the second step of determining another access gateway, subsequent to the receipt of the message originating from the network access gateway. In other embodiments, the other access gateway is determined by an entity able to provide network policies, the latter initiating the creation of the session to the other access gateway. The other access gateway then transmits the "PDN Connectivity Request" message to the mobility management entity.

Advantageously, the access gateway with which the session is established implements the detection step and the first determination step and transmits to the mobility management entity the request regarding establishment of the new session, said mobility management entity then implementing the second determination step and the step of triggering the establishment of the new session.

This implementation of the communication method is particularly suitable when the network does not comprise any entity able to provide network policies.

Advantageously, the mobility management entity transmits to the user equipment a request regarding establishment of the new session.

The establishment request then comprises in this case an indication that it is performed on the initiative of the network.

When the communication network comprises entities for controlling network policies and charging, the detection step and the first determination step are implemented by an entity applying network policies and, an entity providing the network policies determines the other access gateway and transmits to said other access gateway the request regarding establishment of the new session.

In this case, the other gateway for access to the network triggers the establishment of the new session.

According to a second aspect, the invention relates to a system in a packet mode communication network, designed to establish at least one session between at least one user equipment and a gateway for access to a data network by way of an access network. This system comprises:
  means for detecting a request for access to a service on the basis of at least one packet transmitted by the user equipment by means of the established session;
  first determination means, designed to determine as a function of at least one criterion that a new session has to be established;
  second determination means, designed to determine another access gateway suitable for the service requested by the user equipment;
  means for triggering establishment of said new session between the user equipment and said other access gateway, said establishment being initiated by an entity of the packet mode communication network.

According to a particular characteristic of the system, the user equipment is designed to receive a request regarding establishment of a new session and to process said request.

According to a third aspect, the invention also relates to a computer program comprising instructions for the implementation of the communication method according to the first aspect, implemented by an entity of the communication network, when this program is executed by a processor.

BRIEF DESCRIPTION OF THE DRAWINGS

The invention will be better understood with the aid of the following description of particular embodiments of the method of the invention, with reference to the appended drawings in which.

DETAILED DESCRIPTION OF ILLUSTRATIVE EMBODIMENTS

Figure 2:
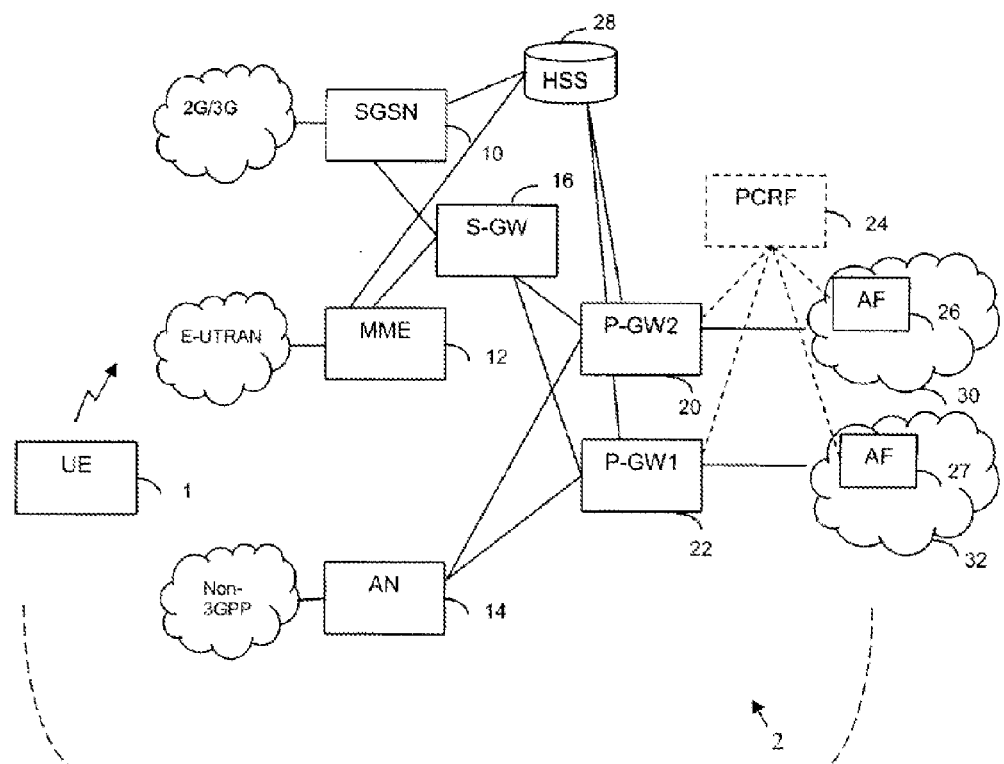
FIG. 2 represents a packet mode communication network according to a particular embodiment of the invention.

FIG. 2 represents in a simplified manner a packet mode communication network 2. A user equipment UE 1 is represented in its environment. The user equipment 1 can access, in packet mode, data networks 30, 32 by way of various types of access networks. Considered here is the particular case where the communication network 2 complies with an EPS architecture ("Evolved Packet System"), such as specified in 3GPP standard TS 23 401 v8.11.0. It is stressed here that the versions corresponding to "Release" 8 are mentioned subsequently. No limitation is attached to this Release number, the communication method also being applicable to the subsequent versions of these standards.

The access network can be radio, complying or not with the specifications defined by the 3GPP standardizing organization, or else wire-based.

A first type of access network corresponds to a second-generation 2G or else third-generation 3G radio access network. In this case, radio access is performed by way of a GERAN entity ("GSM/EDGE Radio Access network") for 2G radio access, or else of a UTRAN entity ("UMTS Terrestrial Resource Access Network") for 3G radio access.

A second type of access network corresponds to an LTE, for "Long Term Evolution", radio access network corresponding to the evolutions of the third generation, also called pre-4G. In this case, radio access is performed by way of an E-UTRAN entity, for "Evolved UTRAN".

These first two types of access networks comply with the set of specifications defined by the 3GPP standardization group.

A third type of access network groups together the set of accesses not complying with 3GPP. The third type of radio access network is linked to an access node entity AN 14. This is for example a wire-based access of ADSL type, a WIFI® radio access, WiMAX for "Worldwide Interoperability for Microwave Access", CDMA, etc.

The first two types of access networks are linked respectively to mobility management entities. For 2G/3G radio access, such an entity 10 is called SGSN, for "Serving GPRS Service Node". For LTE radio access, such an entity 12 is called MME, for "Mobility Management Equipment". These two mobility management entities are linked to an attachment gateway 16 S-GW, for "Serving Gateway". They are also linked to a server of the subscribers of the network HSS 28, for "Home Subscriber System", this server storing the set of subscription data for the subscribers of the communication network 2.

The attachment gateway 16 and the access node entity 14 are linked to two access gateways P-GW1 and P-GW2. The access gateway P-GW1 22 makes it possible to access the first data network 32 in packet mode. The access gateway P-GW2 20 makes it possible to access the second data network 30 in packet mode. By way of example, the first data network 32 corresponds to the IP data network and allows access to services of Internet type. The second data network 30 corresponds to a data network specific to an operator and allows access to services offered by this operator. Application servers AF 26 and 27, for "Application Function" are also represented in FIG. 2. The application server AF 26 makes it possible to provide a service to the user in the data network 30. The application server AF 27 makes it possible to provide a service to the user in the data network 32.

It is also envisaged in an optional manner that entities of the communication network 2 implement a PCC ("Policy Control and Charging") network policies and charging control. Such a communication network 2 then comprises a PCEF ("Policy and Charging Enforcement Function") policies application function, and a PCRF ("Policy and Charging Rules Function") rules provision function. In FIG. 2 is represented an entity for providing PCRF rules 24. The latter is connected to the two access gateways 20, 22. In this case, these latter implement the PCEF function. The communication network 2 can also comprise the implementation of policies and charging control rules (PCEF function) in the absence of a PCRF entity.

Of course the communication network 2 represented in FIG. 2 comprises only a limited number of entities represented so as not to overload this figure. No limitation is attached to this representation. It is also stressed that the attachment gateway S-GW and one of the access gateways can be grouped together in one and the same entity.

Hereinafter, an association between a user equipment UE, represented by an IPv4 address and/or an IPv6 prefix, and the packet data network, represented by an APN ("Access Point Name") data network identifier, is called a session or connection to a packet data network. This session can equally well be called an "IP-CAN session", "PDN Connection" for LTE access, or "PDP Context" for 2G/3G access.

The method of communication between a user equipment UE and a data network will now be described in conjunction with FIG. 1 in a first embodiment.

In a first step E1, more precisely in a sub-step E11, a gateway P-GW1 for access to a packet data network receives data packets originating from the user equipment UE by means of a first established session. This first session has been established between the user equipment UE 1 and the access gateway P-GW1 22 for example during the attachment of the user equipment to the communication network 2. No limitation is attached to the mode of establishment of this first session. The first session is established by way of the attachment gateway S-GW 16. Still in this first step E1, the access gateway P-GW1 22 detects that at least one of the data packets received comprises a request for access to a given new service Detection that this is a request for access to a given service can be carried out according to various variants:
 according to a first variant, this may involve inspection of a stream of data packets at OSI levels 3 or 4, also called SPI for "Shallow Packet Inspection". In this case this entails an IP and TCP ("Transmission Control Protocol"), or UDP ("User Datagram Protocol"), data packets inspection; more precisely, detection can consist in detecting a given IP destination address and a given destination port;
 according to a second variant, this may also involve thorough inspection of the stream of data packets at OSI levels 7 and above or "Deep Packet Inspection".

In a sub-step E12, the access gateway P-GW1 22 then determines that it is necessary to establish a new session between the user equipment UE 1 and another access gateway allowing access to a packet data network as a function of at least one criterion. This criterion can correspond for example to an identifier of the service or else an identifier of an application. The access gateway P-GW1 22 then transmits a request regarding establishment of the new session with the user equipment UE 1 on the initiative of one of the entities of the network, this request comprising a specific indicator, for example an identifier of the service. More precisely, this establishment request is transmitted to the attachment gateway S-GW 16, which transmits it in its turn to the mobility management entity SGSN/MME 10, 12.

In a step E2, more precisely in a sub-step E21, the mobility management entity SGSN/MME 10, 12 receives the request regarding establishment of the new session with the user equipment UE 1 on the initiative of the network and determines the other gateway for access to a packet data network as a function of the specific indicator, by consulting for example a DNS ("Domain Name Server") database. More precisely, the mobility management entity SGSN/MME 10, 12 interrogates the DNS database on the basis of an APN data network identifier and of the specific indicator and obtains in return the other access gateway P-GW2 20 and the same or another identifier of the APN data network. Optionally, one or more items relating to the user equipment can also be taken into account when choosing the other access gateway P-GW2 20. This item can correspond to an item relating to a location of the user equipment. The choice of this other access gateway suitable for the location of the user equipment thus makes it possible to decrease the load in the network. It can also involve an item relating to user equipment subscription data, thereby making it possible to select an access gateway with a service level suitable for the subscription. It may further entail a type of the user equipment.

In a sub-step E22 of step E2, one of the entities of the network triggers establishment of this new session between the user equipment UE 1 and the other access gateway P-GW2 20 determined in sub-step E21. It is stressed here that this establishment is on the initiative of the network. In the current versions of the standard for an access network of E-UTRAN type, only a user equipment can initiate such an establishment of a new session.

The entity of the network implementing this step E2 is specified subsequently in conjunction with the descriptions of FIGS. 3*a*, 3*b*.

In a second embodiment, entities of the network implement a PCC ("Policy Control and Charging") network policies and charging control.

In such a second embodiment, the access gateway P-GW1 22 comprises a PCEF policies application function and implements step E1 previously described. The request regarding establishment of a new session is then transmitted to the entity implementing the PCRF provision function. This PCRF entity 24 then implements step E2. The establishment of the new session is thus initiated by the PCRF entity 24. This second embodiment is described more precisely in conjunction with FIG. 4.

In a third embodiment, an application server AF 26 receives the data packets originating from the user equipment UE 1. The application server AF 26 then provides the PCRF entity 24 with a message of service-related items. This message is received during sub-step E11. The entity implementing the policies control function then implements steps E1 and E2. This third embodiment is described more precisely in conjunction with FIG. 5.

The first embodiment will be described more precisely in conjunction with FIGS. 3*a* and 3*b*. FIG. 3*a* corresponds to access of the user equipment UE by way of an E-UTRAN access network. FIG. 3*b* corresponds for its part to access of the user equipment UE by way of a GERAN or UTRAN access network. The variant applicable to a non-3GPP access network is not described in an explicit manner but the communication method is also transposable to this type of access network.

More precisely, considered here is the particular case where the communication network does not implement an architecture comprising a PCRF entity. However, this does not exclude in such a network the implementation of policies and charging control rules of PCC type.

Figure 3A:
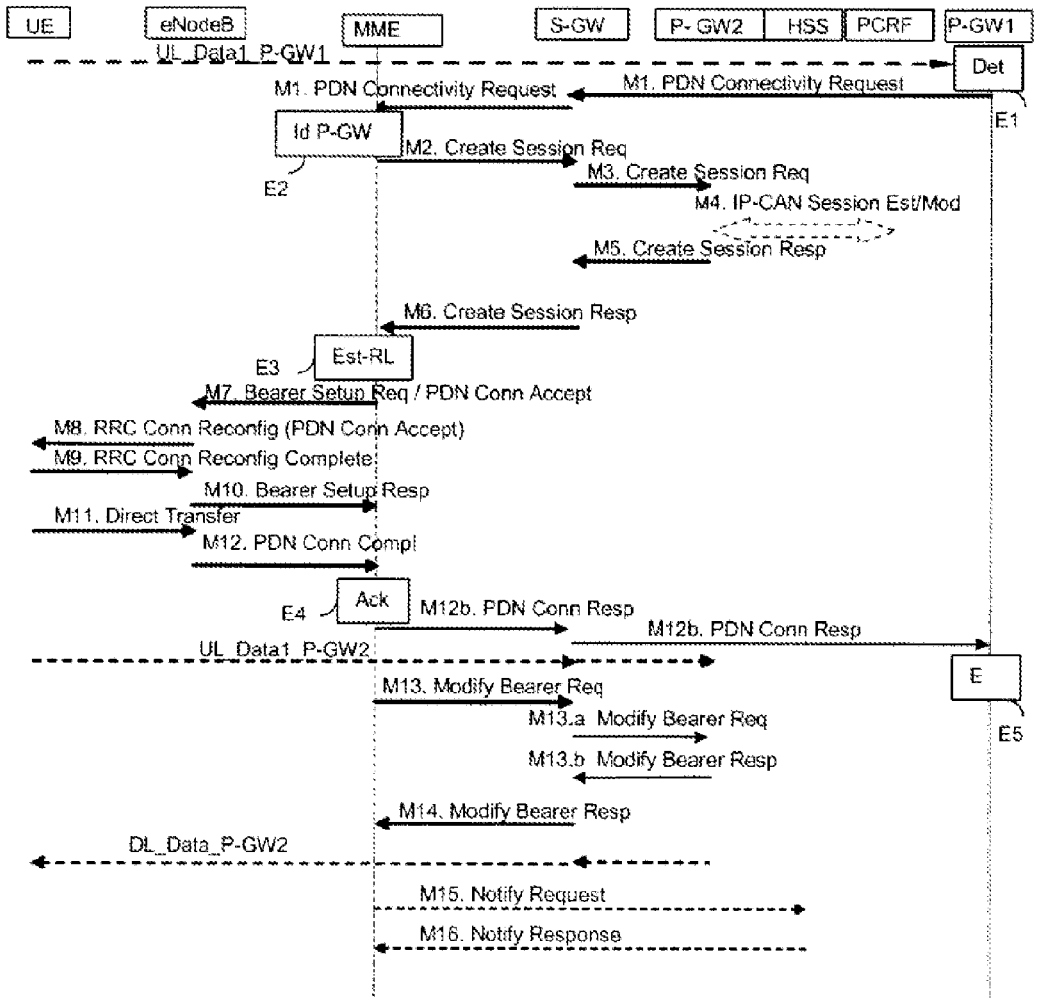
FIG. 3a represents the message exchanges and the steps of the communication method which are implemented according to a first variant of a first particular embodiment of the invention.

FIG. 3*a* describes the exchanges between the various facilities for the implementation of the communication method according to the first embodiment in a first variant, that is to say in the case of an E-UTRAN access network.

As described previously in conjunction with FIG. 1, the access gateway P-GW1 22 receives data packets originating from the mobile entity UE 1, detects a request for access in at least one packet, determines that a new session has to be established and transmits a request regarding establishment of the new session to the mobility management entity MME 12 by way of the attachment gateway S-GW 16. In this first embodiment, the establishment request is a message M1 "PDN Connectivity Request" comprising in particular the following parameters:

a packet data network APN identifier to which the user equipment desires access;

an identifier of the IP version requested "PDN Type", that is to say IPv4, IPv4v6, IPv6;

items intended to be transmitted destined for the user equipment UE 1 in a transparent manner, grouped together in an information field called "Protocol Configuration Options";

a type of request "Request Type".

These various parameters are coded in accordance with the coding envisaged in 3GPP standard TS 23.401, paragraph 5.10.2, for a "PDN Connectivity Request" message when it is emitted by the user equipment UE.

According to the invention, the message M1 "PDN Connectivity Request" also comprises a specific indicator, for example an identifier of the service.

Figure 1:
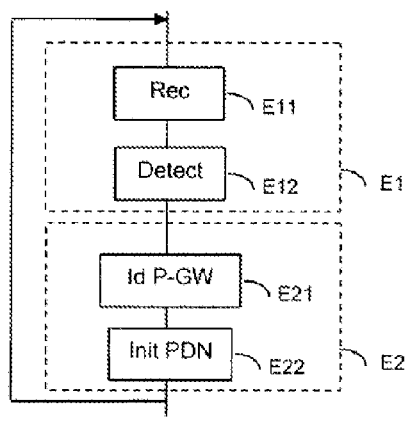
FIG. 1 represents the steps of the communication method according to a particular embodiment of the invention.

During this step E2 previously described in conjunction with FIG. 1, the mobility management entity MME 12 receives the message M1 "PDN Connectivity Request" and performs a DNS domain name resolution request toward a DNS server, not represented in FIG. 2. The mobility management entity MME 12 interrogates the DNS server on the basis of the APN data network identifier and of the specific indicator and obtains in return another gateway for access to the network suitable for the service requested and an APN data network identifier, identical or different from that provided. It is stressed here that this interrogation of the DNS database can also be performed as two distinct requests, a first to obtain an APN data network identifier for the service and a second to obtain the other access gateway.

An item relating to the user equipment can also be transmitted to the DNS server and thus taken into account when choosing the other access gateway P-GW2 20. As indicated previously, this may be an item relating to a location of the user equipment, an item relating to user equipment subscription data or else an item relating to a type of user equipment.

When the APN data network identifier is not present in the "PDN Connectivity Request" message, the mobility management entity MME 12 determines prior to the resolution request an APN data network identifier on the basis of a default subscribed PDN context.

The DNS server verifies that the APN data network identifier provided by the mobility management entity MME 12 does indeed correspond to an identifier authorized for the given service. If such is not the case, the DNS server modifies this APN data network identifier. The DNS server determines an access gateway P-GW2 20 suitable for the service requested, if appropriate also as a function of the items relating to the user equipment, and in return provides the mobility management entity MME 12 with an identifier of this access gateway P-GW2 20 and an APN data network identifier.

The mobility management entity MME 12 then verifies as a function of the subscription data for the user equipment UE 1 that the APN data network identifier provided by the DNS server is authorized and if such is the case, the mobility management entity MME 12 uses for the following steps the identifier of the access gateway P-GW2 and the APN data network identifier provided.

In sub-step E22 of step E2, the mobility management entity MME 12 then triggers the establishment of this new session between the user equipment UE 1 and the access gateway P-GW2 20 determined in conjunction with the APN data network identifier.

The 3GPP standard TS 23.401 "LTE; General Packet Radio Services (GPRS) enhancements for Evolved Universal Terrestrial Radio Access Network (E-UTRAN) access", v8.11.0, specifies in particular in paragraph 5.10.2 in conjunction with FIG. 5.10.2-1, the exchanges between the various facilities of the network in response to a PDN connectivity request initiated by the user equipment. It is stressed here that, according to the invention, the establishment of this new session is on the initiative of one of the entities of the network. However, certain exchanges are common to the two procedures. Only the modifications made to the exchanges envisaged for the procedure on the initiative of the user equipment are stressed subsequently.

More precisely, in a first phase, the new session will be created at the network entities level. The mobility management entity MME 12 creates a message M2 "Create Session Request" and transmits it to the attachment gateway S-GW 16. The latter transmits in its turn a message M3 "Create Session Request" to the access gateway P-GW2 20. If dynamic control of policies and charging is implemented, the access gateway P-GW2 20 talks to the PCRF entity 24 in an exchange M4 "IP-CAN Session Establishment/Modification". Next, once the new session has been created, the access gateway P-GW2 20 transmits the response in a message M5 "Create Session Response" destined for the attachment gateway S-GW 16. The attachment gateway S-GW 16 then returns a message M6 "Create Session Response" to the mobility management entity MME 12. This set of exchanges is performed in accordance with paragraph 5.10.2 of the standard TS 23.401 and is not detailed here.

Next, in a second phase, more precisely in a step E3, the mobility management entity MME 12 initiates the establishment of the new session toward the user equipment UE 1. This set of exchanges is performed in accordance with paragraph 5.10.2 of the standard TS 23.401 when it is initiated by the user equipment and is modified to implement the invention. According to the invention, the mobility management entity MME 12 transmits a message M7 "PDN Connectivity Accept" destined for the user equipment UE 1 contained in a control message S1_MME "Bearer Setup Request". The latter is destined for the E-UTRAN access network, the latter comprising an eNodeB entity. According to the invention, the message M7 "PDN Connectivity Accept" comprises in particular an indication that the establishment is on the initiative of the network. The eNodeB entity then transmits a message M8 "PDN Connectivity Accept" contained in a message "RRC Connection Reconfiguration" destined for the user equipment UE 1. According to the invention, the user equipment UE 1 is in particular designed to receive the message "PDN Connectivity Accept" comprising the indication that it is emitted on the initiative of the network. The user equipment UE 1 uses the parameters received in the message M8 "PDN Connectivity Accept" contained in the message "RRC Connection Reconfiguration" to update an association between the service requested and an EPS medium. For this purpose, the user equipment UE 1 relies on filters of level 3, 4 (TFT) or 7 to update this association. Once the reconfiguration has been performed, the user equipment UE 1 transmits a message M9 "RRC Connection Reconfiguration Complete" destined for the eNodeB entity. The latter transmits in its turn a message M10 "Bearer Setup Response" destined for the mobility management entity MME 12. Next, the user equipment UE 1 transmits a message M11 "Direct Transfer" comprising a message "PDN Connectivity Complete" destined for the eNodeB entity. The latter then transmits the message M12 "PDN Connectivity Complete" to the mobility management entity MME 12.

The message M12 is received in a step E4 by the mobility management entity MME 12.

According to the invention, the mobility management entity MME 12 then transmits a message M12b "PDN Connectivity Response" destined for the attachment gateway S-GW 16. The attachment gateway S-GW 16 transmits in its turn the message M12b destined for the access gateway P-GW1 22. The message M12b is received by the access gateway P-GW1 22 in a step E5. This terminates the procedure requesting establishment of a new session, which was triggered by the access gateway P-GW1 22 during step E1.

In parallel, subsequent to the receipt of the messages M10 "Bearer Setup Response" and M12 "PDN Connectivity Complete", the mobility management entity MME 12 transmits a message M13 "Modify Bearer Request" destined for the attachment gateway S-GW 16. The messages M13a "Modify Bearer Request", M13b "Modify Bearer Response" are exchanged if appropriate with the access gateway P-GW2 20 in accordance with 3GPP standard TS 23.401.

The attachment gateway S-GW 16 transmits in response a message M14 "Modify Bearer Response" to the mobility management entity MME 12.

The mobility management entity MME 12 thereafter transmits a message M15 "Notify request" destined for the server HSS 28, this message comprising in particular an identifier of the access gateway P-GW2 20, and an associated APN data network identifier. The server HSS 28 stores these identifiers in association with the user equipment UE 1 and transmits a message M16 "Notify Response" destined for the mobility management entity MME 12.

On completion of these various steps and exchanges of message, the new session is established between the user equipment UE 1 and the access gateway P-GW2 20 in conjunction with the APN data network identifier. The access gateway P-GW2 20 has been selected as a function of a specific indicator, for example the service requested, and if appropriate, as a function of items relating to the user equipment UE 1. The establishment of the new session has been performed on the initiative of one of the entities of the network, more precisely in this first embodiment on the initiative of the mobility management entity MME 12.

Figure 3B:
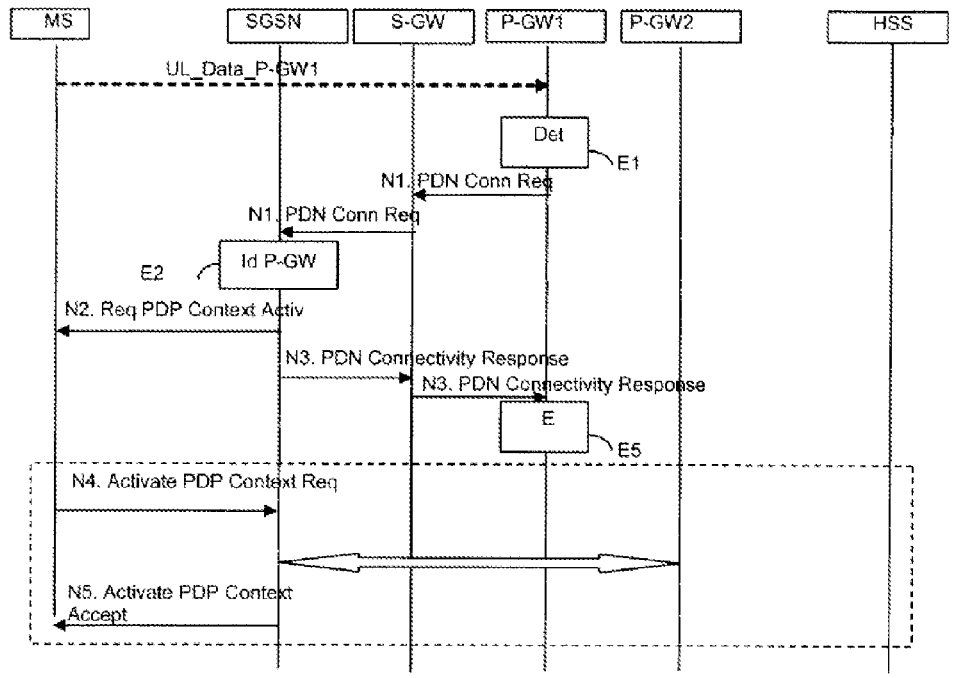
FIG. 3b represents the message exchanges and the steps of the communication method which are implemented according to a second variant of the first particular embodiment of the invention.

FIG. 3b describes the exchanges between the various facilities for the implementation of the communication method according to the first embodiment, in a second variant, that is to say in the case of a GERAN/UTRAN access network. In this case, the session is also called a "PDP context".

As described previously in conjunction with FIG. 1, the access gateway P-GW1 22 receives data packets originating from the mobile entity UE 1, detects a request for access to a service, determines that a new session has to be established and transmits a request regarding establishment of a new session to the mobility management entity SGSN 10 by way of the attachment gateway S-GW 16. The establishment request is a message N1 "PDN Connectivity Request" analogous to the message M1, described previously in conjunction with FIG. 3*a*.

During step E2 previously described in conjunction with FIG. 1, the mobility management entity SGSN 10 receives the message N1 "PDN Connectivity Request" and performs the processings described in conjunction with FIG. 3*a*, in order to obtain an identifier of an access gateway P-GW2 20 and an APN data network identifier.

In sub-step E22 of step E2, the mobility management entity SGSN 10 then triggers the establishment of the new session between the user equipment UE 1 and the access gateway P-GW2 20 determined in conjunction with the APN data network identifier.

Recall that 3GPP standard TS 23.060 "GPRS; Service Description; Stage 2", v8.10.0, specifies in particular in paragraph 9.2.2.2 in conjunction with figure 67 the exchanges between the various facilities of the network allowing a GGSN gateway node entity to trigger a procedure for activating a PDP context by the mobility management entity SGSN. This procedure for activating a PDP context is on the initiative of the GGSN gateway node entity, on receipt of data to be transmitted destined for the user equipment UE. The gateway node transmits for this purpose a message "PDU Notification Request" to the mobility management entity SGSN. It is recalled here that a GGSN gateway node corresponds to a combination of the functions of the attachment gateway S-GW and of the gateway for access to a data network P-GW. Thus, this procedure, such as envisaged in the standard, does not envisage a modification of the GGSN gateway node which has transmitted the message "PDU Notification Request". Moreover, it requires that a static PDP information item be associated with the PDP address in order to be able to reach the user equipment and therefore, is not implemented in the communication networks. This procedure is used here in a different context from that for which it is envisaged, given that a session is already established and that it makes it possible to establish a session to another access gateway.

Thus, the exchanges described here rely on this procedure but modifications are made to the latter to implement the invention. According to the invention, the establishment of this new session is on the initiative of one of the entities of the network but is triggered by the implementation of step E2 at the level of the mobility management entity SGSN, once the access gateway P-GW2 has been determined.

More precisely, the mobility management entity SGSN 10 transmits a message N2 "Request PDP Context Activation" destined for the user equipment UE 1, so that the latter initiates the establishment of the PDP context requested. According to the invention, the mobility management entity SGSN 10 also transmits a message N3 "PDN Connectivity Response" destined for the attachment gateway S-GW 16. The attachment gateway S-GW 16 transmits in its turn the message N3 destined for the access gateway P-GW1 22. The message N3 is received by the access gateway P-GW1 22 in a step E5. This terminates the procedure requesting establishment of a new session, which was triggered by the access gateway P-GW1 22 during step E1.

The user equipment UE 1 uses the parameters received in the message N2 "Request PDP Context Activation" to update an association between the service requested and a medium. For this purpose, the user equipment UE 1 relies on filters of level 3, 4 (TFT) or 7 to update this association. Once the reconfiguration has been performed, the user equipment UE then transmits a message N4 "Activate PDP Context Request" destined for the mobility management entity SGSN 10, which thereafter establishes the new session with the access gateway P-GW2 20. Once the latter has been established, the mobility management entity SGSN 10 transmits a message N5 "Activate PDP Context Accept" to the user equipment UE 1.

On completion of these various steps and exchanges of message, the new session is established between the user equipment UE 1 and the gateway for access to the data network P-GW2 20 in conjunction with the APN data network identifier. The access gateway P-GW2 20 has been selected as a function of the specific service requested and if appropriate, as a function of items relating to the user equipment UE. The establishment of the new session has been performed on the initiative of one of the entities of the network, more precisely in this first embodiment on the initiative of the mobility management entity SGSN 10.

Figure 4:
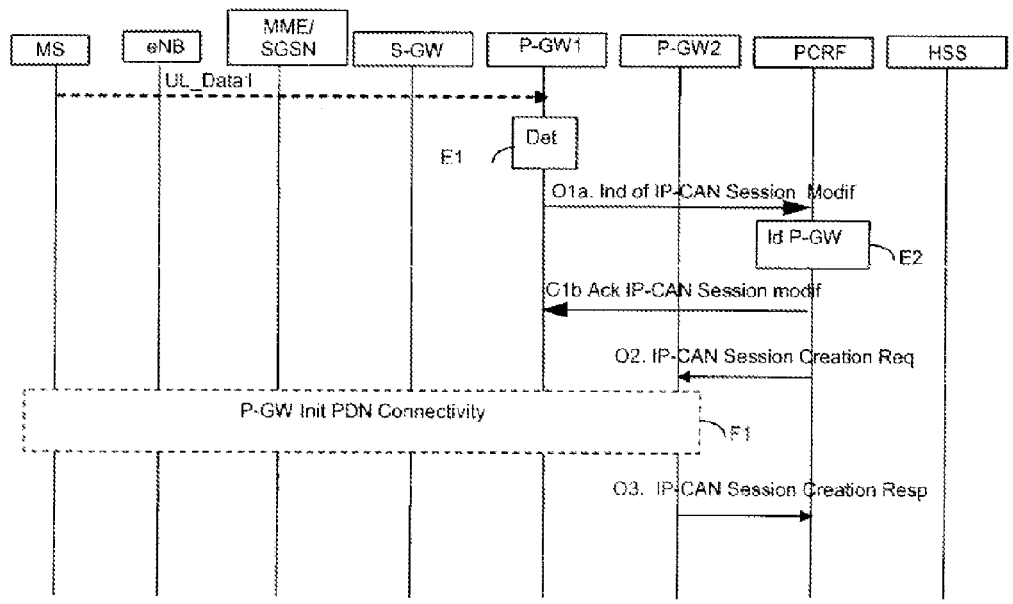
FIG. 4 represents the message exchanges and the steps of the communication method which are implemented according to a second particular embodiment of the invention.

The second embodiment will be described more precisely in conjunction with FIG. 4. FIG. 4 describes the exchanges between the various facilities for the implementation of the communication method according to the second embodiment, in the case of an E-UTRAN radio access network. FIG. 4 is readily transposable to an access of the user equipment UE 1 by way of the GERAN or UTRAN radio access network. The variant applicable to a non-3GPP access network is not described in an explicit manner but the communication method is also transposable to this type of access network.

More precisely, considered here is the particular case where the communication network implements an architecture with a PCRF entity to ensure the PCC policies and charging control.

As described previously in conjunction with FIG. 1, during step E1, the access gateway P-GW1 22, implementing the PCEF function, receives data packets originating from the mobile entity UE 1, detects a request for access to a service and determines that a new session must be established. The access gateway P-GW1 22 then transmits a request regarding establishment of a new session to the PCRF entity 24. More precisely in this case, the establishment request corresponds to a modification request for the session. In this second embodiment, the modification request corresponds to a message O1a "Indication of IP-CAN Session Modification" requesting a modification of the IP-CAN session. In accordance with 3GPP standard TS 23.203 v8.11.0, paragraph 7.4.1 and FIG. 7.4, this message O1a comprises the following parameters:

- an information field "Event report";
- an information field "affected PCC rules" comprising control rules for the PCC policies affected.

According to the invention, this message O1a "Indication of IP-CAN Session Modification" also comprises:

- an identifier of the PDN session or connection concerned, if said identifier is available;
- the specific indicator, for example the identifier of the service;
- the address in the network of the attachment gateway S-GW.

During step E2 previously described in conjunction with FIG. 1, the PCRF entity 24 receives the message O1a "Indication of IP-CAN Session Modification" and correlates the policies control rules with the IP-CAN session and the specific indicator.

The PCRF entity 24 verifies that the session between the user equipment UE 1 and the access gateway P-GW1 22 is not suitable and decides to establish a new IP-CAN session. On the basis of data associated with the service, the PCRF entity 24 determines the most suitable access gateway, in the example described here the other access gateway P-GW2 20 and an APN data network identifier as a function of the specific indicator. The PCRF entity 24 also verifies the subscription data associated with the user. They may be internal to the PCRF entity or else obtained on the basis of some other entity, such as the server of the subscribers of the network HSS 28, a DNS domain names server, an AAA ("Authentication, Authorization, Accounting") entity, the latter being in charge of the process for controlling and managing accesses of users to a network, etc.

An item relating to the user equipment can also be taken into account when choosing the other access gateway P-GW2 20. As indicated previously, this may be an item relating to a location of the user equipment, an item relating to user equipment subscription data or else an item relating to a type of the user equipment.

In an optional manner, when the address of the attachment gateway S-GW has not been provided by the access gateway P-GW1 in the message O1a, the PCRF entity 24 can also obtain during this step E2 in particular the current access node, by interrogating the server HSS 28 or the AAA entity. The current access node can be a mobility management entity MME 12 or else SGSN 10 or else an attachment gateway S-GW 16 for an access network of 3GPP type (E-UTRAN, UTRAN, GERAN). The current access node can be of any type for a non-3GPP access network.

The PCRF entity 24 then transmits a message O1b "Acknowledge of IP-CAN Session Modification" to the access gateway P-GW1 22. This message O1b complies with 3GPP standard TS 23.203 v8.11.0, paragraph 7.4.1.

According to the invention, the PCRF entity 24 triggers the creation of the new IP-CAN session. For this purpose, the PCRF entity 24 transmits a message O2 "IP-CAN Session Creation Request" destined for the other access gateway P-GW2 20. This message O2 comprises the following elements:
- the address in the network of the attachment gateway S-GW;
- a public identifier of the user equipment, for example the MSISDN number, for "Mobile Subscriber ISDN Number";
- the determined APN data network identifier.

The access gateway P-GW2 20 receives the message O2 "IP-CAN Creation Request" in a step F1. As a function of the type of access network, E-UTRAN or GERAN/UTRAN, the access gateway P-GW2 20 will initiate different procedures, represented in the form of a single block "P-GW Init PDN Connectivity" in FIG. 4.

When the access network is of E-UTRAN type, the access gateway P-GW2 20 triggers establishment of the new session as described in conjunction with FIG. 3a. More precisely, the access gateway P-GW2 20 transmits a message M1 "PDN Connectivity Request" to the attachment gateway S-GW 16 whose address was transmitted in the message O2. The various exchanges of message and steps are implemented such as described in conjunction with FIG. 3a. Only the step of determining the data network identifier and the access gateway at the level of the mobility management entity MME 12 is not implemented, given that they have already been determined by the PCRF entity.

When the access network is of GERAN/UTRAN type, the access gateway P-GW2 20 triggers establishment of the new session as described in conjunction with FIG. 3b. More precisely, the access gateway P-GW2 20 transmits a message N1 "PDN Connectivity Request" to the attachment gateway S-GW 16 whose address was transmitted in the message O2. The various exchanges of message and steps are implemented such as described in conjunction with FIG. 3b. Only the step of determining the data network identifier and the access gateway at the level of the mobility management entity SGSN 10 is not implemented, given that they have already been determined by the PCRF entity 24.

Once the new session has been created, the access gateway P-GW2 20 transmits a message O3 "IP-CAN Session Creation Response" destined for the PCRF entity 24.

On completion of these various steps and exchanges of message, the new session is established between the user equipment UE 1 and the access gateway P-GW2 20 in conjunction with the APN data network identifier. The access gateway P-GW2 20 has been selected as a function of the specific service requested and if appropriate, as a function of items relating to the user equipment UE. The establishment of the new session has been performed on the initiative of one of the entities of the network, more precisely in this second embodiment on the initiative of the PCRF entity 24.

Figure 5:
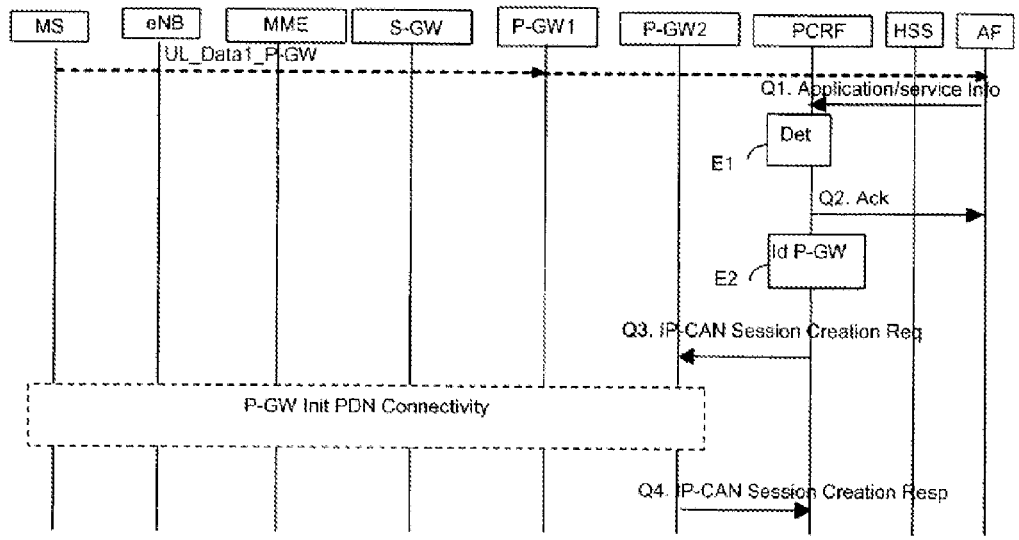
FIG. 5 represents the message exchanges and the steps of the communication method which are implemented according to a third particular embodiment of the invention.

FIG. 5 describes the exchanges between the various facilities for the implementation of the communication method according to the third embodiment, in the case of an E-UTRAN access network.

As described previously in conjunction with FIG. 1, an application server AF 26 receives data packets originating from the mobile entity UE 1 by way of the access gateway P-GW1 by means of the established session and provides the PCRF entity 24 with items relating to the service in a message Q1 "Application/service Info". This message Q1 comprises in particular items relating to the user equipment, such as the public MSISDN number, or an address in the network of the user equipment.

The message Q1 is received by the PCRF entity during step E1. Still during step E1, the PCRF entity 24 detects the request for access to the service on the basis of the message Q1 and determines that a new session must be created. It is stressed that in this third embodiment, the detection step is implemented indirectly on the basis of at least one data packet. The PCRF entity 24 acknowledges the message Q1 through a message Q2 "Ack" destined for the application server AF 26.

During step E2 previously described in conjunction with FIG. 1, the PCRF entity 24 correlates the policies control rules with the IP-CAN session and the specific indicator.

The PCRF entity 24 detects that the session between the user equipment UE 1 and the access gateway P-GW1 22 is not suitable and decides to establish a new IP-CAN session. On the basis of data associated with the service, the PCRF entity 24 determines the most suitable access gateway, in the example described here the other access gateway P-GW2 20 and an APN data network identifier as a function of the specific indicator. The PCRF entity 24 also verifies the subscription data associated with the user.

An item relating to the user equipment can also be taken into account when choosing the other access gateway P-GW2. As indicated previously, this may be an item relating to a location of the user equipment, an item relating to user equipment subscription data, or else a type of the user equipment.

The creation of the new session is then implemented in a manner analogous to what was described in conjunction with FIG. 4, by exchange of messages Q3 "IP-CAN Session Creation Request" and Q4 "IP-CAN Session Creation Response".

On completion of these various steps and exchanges of message, the new session is established between the user equipment UE 1 and the access gateway P-GW2 20 in conjunction with the APN data network identifier. The access gateway P-GW2 20 has been selected as a function of the specific service requested and if appropriate, as a function of items relating to the user equipment UE 1. The establishment of the new session has been performed on the initiative of one of the entities of the network, more precisely in this third embodiment on the initiative of the PCRF entity 24.

It is stressed here that the descriptions of these second and third embodiments have been carried out in the particular case where the PCEF policies application function is implemented by the data network access gateway. They are also transposable in the particular case of an option of the standard, in which a facility called TDF, for "Traffic Detection Function", is external to the network access gateway.

Figures 6A, 6B:
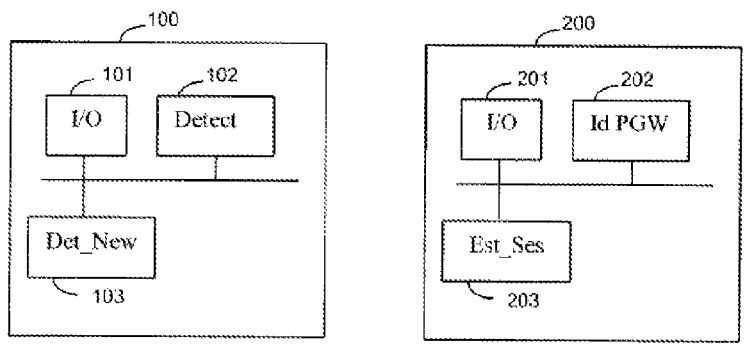
FIGS. 6a, 6b, 6c represent entities of the communication network according to particular embodiments of the invention.
Figure 6C:
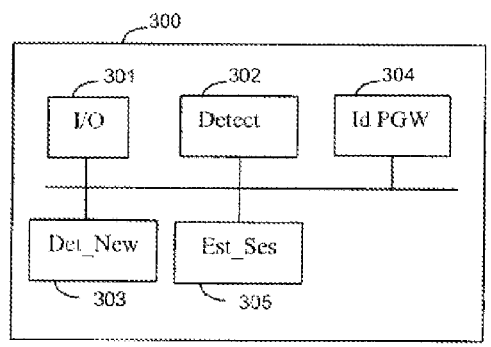

FIGS. 6a, 6b, 6c represent in a simplified manner entities of the communication network. For the sake of clarity, only the elements of the entities necessary for the understanding of the invention are represented.

A first entity 100 is represented in FIG. 6a. It comprises in particular:
- a communication module 101, designed to communicate with the other entities of the network;
- a detection module 102, designed to detect a request for access to a service on the basis of at least one packet transmitted by the user equipment by means of the established session;
- a determination module 103, designed to determine as a function of at least one criterion that a new session has to be established.

Such a first entity 100 corresponds to an access gateway P-GW1 according to the first and second embodiments.

This first entity 100 cooperates in particular with a second entity 200 of the communication network. Such a second entity 200 is represented in FIG. 6b and comprises in particular:
- a communication module 201, designed to communicate with the other entities of the network;
- a determination module 202, designed to determine another access gateway suitable for the service requested by the user equipment;
- a triggering module 203, designed to trigger establishment of a new session between the user equipment and another determined access gateway, this establishment being initiated by one of the entities of the packet mode communication network.

Optionally, the determination module 202 is also designed to determine a data network identifier.

Such a second entity 200 corresponds for example:
- to one of the mobility management entities MME/SGSN 10, 12 in the first embodiment;
- to the PCRF entity 24 in the second embodiment.

The second entity 200 in the second embodiment, that is to say the PCRF entity 24, cooperates with the other access gateway P-GW2, so as to trigger the establishment of the new session by the mobility management entity MME/SGSN.

A third entity 300 is represented in FIG. 6c for the third embodiment. This third entity 300 corresponds to a PCRF entity 24 and comprises:
- a communication module 301, designed to communicate with the other entities of the network;
- a detection module 302, designed to detect a request for access to a service on the basis of a message transmitted by the application server AF 26, whose emission is triggered by the receipt of at least one packet transmitted by the user equipment by means of the established session;
- a first determination module 303, designed to determine as a function of at least one criterion that a new session has to be established.
- a second determination module 304, designed to determine another access gateway suitable for the service requested by the user equipment;
- a triggering module 305, designed to trigger establishment of a new session between the user equipment and another determined access gateway, this establishment being initiated by one of the entities of the packet mode communication network.

Optionally, the second determination module 304 is also designed to determine a data network identifier.

The third entity 300 cooperates with the other access gateway P-GW2, so as to trigger the establishment of the new session by the mobility management entity MME/SGSN.

The user equipment UE 1 also comprises according to the invention means designed to receive a request regarding establishment of the new session and to process this request. More precisely, in the case of an E-UTRAN access network, these means are designed to receive a message "PDN Connectivity Accept" emitted on the initiative of the network and borne by a message "RRC Connection Reconfiguration", update an association between the service requested and a medium as a function of the messages received and transmit a message "RRC Connection Reconfiguration Complete". In the case of a GERAN/UTRAN access network, these means are designed to receive a message "Request PDP Context Activation" emitted on the initiative of the network, update an association between the service requested and a medium as a function of the messages received and transmit a message "Activate PDP Context Request".

The invention also relates to a system 3 of the packet mode communication network, designed to establish at least one session between at least one user equipment and a gateway for access to a data network by way of a radio access network. This system comprises:
- a module 102, 302 for detecting a request for access to a service on the basis of at least one packet transmitted by the user equipment by means of the established session;
- a first determination module 103, 303, designed to determine as a function of at least one criterion that a new session has to be established;
- a second determination module 202, 304, designed to determine another access gateway suitable for the service requested by the user equipment;
- a module 203, 305 for triggering establishment of said new session between the user equipment and said other access gateway, said establishment being initiated by an entity of the packet mode communication network.

The various modules of an entity 100, 200, 300 are designed to implement those steps of the previously described communication method that are executed by the entity. These are preferably software modules comprising software instructions for executing those steps of the previously described communication method that are implemented by an entity of the communication network. The invention therefore also relates to:

- a program for entity, comprising program instructions intended to command the execution of those steps of the previously described communication method which are executed by said entity, when said program is executed by a processor of the latter;
- a recording medium readable by an entity on which the program for entity is recorded.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention claimed is:

1. A method of communication in a packet mode communication network between a user equipment and a data network, a session having been established between said user equipment and a packet gateway for access to the data network, called a P-GW, by way of an access network, said method comprising the following steps implemented by said P-GW:
    a step of detecting a request for access to a service on the basis of at least one packet transmitted by the user equipment by the established session;
    a first step of determining as a function of at least one criterion that a new session has to be established;
    a step of transmitting to a mobility management entity a request regarding establishment of said new session;
and the following steps implemented by said mobility management entity:
    a second step of determining another P-GW as a function of at least one item relating to the user equipment, said other gateway being suitable for the service requested by the user equipment; and
    a step of triggering establishment of said new session between the user equipment and said other P-GW, said establishment being initiated by an entity of the packet mode communication network.

2. The communication method as claimed in claim 1, in which the criterion belongs to the group consisting of an identifier of the service, and an identifier of an application.

3. The communication method as claimed in claim 1, in which the detection step is implemented by inspection of a packet stream associated with said session.

4. The communication method as claimed in claim 1, in which said item belongs to the group consisting of an item relating to a location, an item relating to subscription data, or a type of user equipment.

5. The communication method as claimed in claim 1, in which one of the two packet gateways P-GW transmits a request regarding establishment of a new session to a mobility management entity.

6. The communication method as claimed in claim 5, in which the mobility management entity transmits to the user equipment a request regarding establishment of the new session.

7. A system in a packet mode communication network, designed to establish at least one session between at least one user equipment and a packet gateway, called a P-GW, for access to a data network by way of an access network, said system comprising:
    means for detecting a request for access to a service on the basis of at least one packet transmitted by the user equipment by means of the established session;
    first determination means, designed to determine as a function of at least one criterion that a new session has to be established;
    means for transmitting to a mobility management entity a request regarding establishment of said new session;
    second determination means, located in said mobility management entity, designed to determine another P-GW suitable for the service requested by the user equipment, as a function of at least one item relating to the user equipment; and
    means for triggering establishment of said new session between the user equipment and said other P-GW, said establishment being initiated by an entity of the packet mode communication network.

8. The system as claimed in claim 7, in which the user equipment is designed to receive a request regarding establishment of a new session and to process said request.

9. At least one hardware storage medium comprising computer program instructions stored thereon for implementing a method of communication, when the instructions are executed by at least one processor, wherein the method is performed in a packet mode communication network between a user equipment and a data network, a session having been established between said user equipment and a packet gateway, called a P-GW for access to the data network by way of an access network, said method comprising the following steps implemented by said P-GW:
    a step of detecting a request for access to a service on the basis of at least one packet transmitted by the user equipment by the established session;
    a first step of determining as a function of at least one criterion that a new session has to be established;
    a step of transmitting to a mobility management entity a request regarding establishment of said new session;
and the following steps implemented by said mobility management entity:
    a second step of determining another P-GW as a function of at least one item relating to the user equipment, said other gateway being suitable for the service requested by the user equipment; and
    a step of triggering establishment of said new session between the user equipment and said other P-GW, said establishment being initiated by an entity of the packet mode communication network.

* * * * *